US011770251B2

(12) United States Patent
Nainar et al.

(10) Patent No.: US 11,770,251 B2
(45) Date of Patent: Sep. 26, 2023

(54) CONTINUOUS INTEGRITY VALIDATION-BASED CONTROL PLANE COMMUNICATION IN A CONTAINER-ORCHESTRATION SYSTEM

(71) Applicant: Cisco Technology, Inc., San Jose, CA (US)

(72) Inventors: Nagendra Kumar Nainar, Morrisville, NC (US); Carlos M. Pignataro, Cary, NC (US); Akram Ismail Sheriff, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 17/016,046

(22) Filed: Sep. 9, 2020

(65) Prior Publication Data
US 2022/0078015 A1 Mar. 10, 2022

(51) Int. Cl.
*H04L 29/06* (2006.01)
*H04L 9/32* (2006.01)
(Continued)

(52) U.S. Cl.
CPC .......... *H04L 9/3213* (2013.01); *G06F 9/5072* (2013.01); *H04L 9/0656* (2013.01); *H04L 9/3268* (2013.01)

(58) Field of Classification Search
None
See application file for complete search history.

(56) References Cited

U.S. PATENT DOCUMENTS 10,270,770 B1\* 4/2019 Irwan ................... H04L 63/0876
11,240,025 B2\* 2/2022 Wentz ................. G06F 21/6218
(Continued)

FOREIGN PATENT DOCUMENTS

| CN | 108134706 A | 6/2018 |
| CN | 110995450 A | 4/2020 |
| WO | WO2020106973 A1 | 5/2020 |

OTHER PUBLICATIONS

Todd Rosner, "Kubernetes TLS bootstrapping", Feb. 19, 2018, https://medium.com/@toddrosner/kubernetes-tls-bootstrapping-cf203776abc7, accessed Feb. 11, 2023, p. 1-10. (Year: 2018).\*
(Continued)

*Primary Examiner* — Jeffery L Williams
(74) *Attorney, Agent, or Firm* — Lee & Hayes, P.C.

(57) ABSTRACT

Techniques and mechanisms for providing continuous integrity validation-based control plane communication in a container-orchestration system, e.g., the Kubernetes platform. A worker node generates a nonce and forwards the nonce to a master node while requesting an attestation token. Using the nonce, the master node generates the attestation token and replies back to the worker node with the attestation token. The worker node validates the attestation token with a CA server to ensure that the master node is not compromised. The worker node sends its authentication credentials to the master node. The master node generates a nonce and forwards the nonce to the worker node while requesting an attestation token. Using the nonce, the worker node generates the attestation token and replies back to the master node with the attestation token. The master node validates the attestation token with the CA server to ensure that the worker node is not compromised.

17 Claims, 6 Drawing Sheets

(51) Int. Cl.
*G06F 9/50* (2006.01)
*H04L 9/06* (2006.01)

(56) References Cited

U.S. PATENT DOCUMENTS

| | | | |
|---|---|---|---|
| 11,356,461 B2* | 6/2022 | Nainar | H04L 9/3213 |
| 11,425,111 B2* | 8/2022 | Smith | G06F 21/74 |
| 11,425,134 B1* | 8/2022 | Patimer | G06F 9/452 |
| 2019/0340088 A1 | 11/2019 | Sanakkayala et al. | |
| 2019/0349402 A1* | 11/2019 | Shukla | H04L 63/0263 |
| 2020/0112487 A1* | 4/2020 | Inamdar | H04L 67/56 |
| 2020/0153623 A1* | 5/2020 | Asanghanwa | H04L 9/3213 |
| 2020/0244652 A1* | 7/2020 | Iyer | H04L 9/3247 |
| 2021/0144517 A1* | 5/2021 | Guim Bernat | H04L 9/0637 |
| 2021/0397729 A1* | 12/2021 | McQuaid | G06F 21/6218 |
| 2022/0078015 A1* | 3/2022 | Nainar | H04L 9/3213 |
| 2022/0103570 A1* | 3/2022 | Nainar | H04L 45/46 |
| 2022/0158855 A1* | 5/2022 | Wentz | H04L 9/3247 |
| 2022/0294806 A1* | 9/2022 | Nainar | H04L 63/126 |
| 2023/0025159 A1* | 1/2023 | McQuaid | G06F 16/13 |

OTHER PUBLICATIONS

Kubernetes, "TLS Bootstrapping", Mar. 26, 2020, https://kubernetes.io/docs/reference/command-line-tools-reference/kubelet-tls-bootstrapping/, accessed Feb. 11, 2023, p. 1-16. (Year: 2020).*

Kubernetes, "Authenticating with Bootstrap Tokens", Mar. 26, 2020, https://kubernetes.io/docs/reference/access-authn-authz/bootstrap-tokens/, accessed Feb. 11, 2023, p. 1-6. (Year: 2020).*

Kubernetes, "Certificate Signing Requests", Jul. 5, 2020, https://kubernetes.io/docs/reference/access-authn-authz/certificate-signing-requests/, accessed Feb. 11, 2023, p. 1-8. (Year: 2020).*

Kubernetes, "Authenticating", Aug. 7, 2020, https://kubernetes.io/docs/reference/access-authn-authz/authentication/, accessed Feb. 11, 2023, p. 1-16. (Year: 2020).*

* cited by examiner

```
┌─────────────────────────────────────────────────────────────┐
│  RECEIVE A REQUEST FOR A ATTESTATION TOKEN, THE REQUEST     │
│              INCLUDING A RANDOMLY GENERATED NONCE           │
│                             402                             │
└─────────────────────────────────────────────────────────────┘
                              │
                              ▼
┌─────────────────────────────────────────────────────────────┐
│  BASED AT LEAST IN PART ON THE RANDOMLY GENERATED NONCE,    │
│              GENERATE THE ATTESTATION TOKEN                 │
│                             404                             │
└─────────────────────────────────────────────────────────────┘
                              │
                              ▼
┌─────────────────────────────────────────────────────────────┐
│         PROVIDE THE ATTESTATION TOKEN TO THE SECONDARY NODE │
│                             406                             │
└─────────────────────────────────────────────────────────────┘
                              │
                              ▼
┌─────────────────────────────────────────────────────────────┐
│ RECEIVE AUTHENTICATION CREDENTIALS BASED AT LEAST IN PART ON│
│ THE ATTESTATION TOKEN BEING VERIFIED BY A CERTIFICATE       │
│ AUTHORITY (CA) SERVER                                       │
│                             408                             │
└─────────────────────────────────────────────────────────────┘
```

CONTINUOUS INTEGRITY VALIDATION-BASED CONTROL PLANE COMMUNICATION IN A CONTAINER-ORCHESTRATION SYSTEM

TECHNICAL FIELD

The present disclosure relates generally to using locally generated nonces and attestation tokens for continuous verification and validation of integrity between worker nodes and a master node in a container-orchestration system.

BACKGROUND

In container-orchestrations, Kubernetes is becoming the de-facto platform for container workload instantiation in various customer verticals and use cases. Thus, securing the Kubernetes perimeter is becoming an utmost important task. The communication between the worker node and the master node is highly critical as compromising the communication between the worker nodes and the master node may devastate the entire environment. For example, attackers may wish to gain authenticated access to the application programming interface (API)-server component of the master node. This may allow the attackers to, for example, read secrets or gain access to services in the cluster. This can also lead to code execution on the underlying node machines, facilitating wider lateral movement. Based on this access, it is easier to execute a hypertext transfer protocol (HTTP) GET request-based query to get to know worker node details and then execute security attacks.

Currently transport layer security (TLS) bootstrapping is used by the kubelet component of the worker node to communicate with the API-server component of the master node. The API-server simply relies on the signed certificate authority (CA) certificate that is received by the initial authentication (and request for the certificate) during the initialization phase of worker nodes. An attacker can compromise a node (by leveraging any vulnerability in the kernel or bootloader, etc.) and register with the master node to divert part of the workload to the compromised node.

While current operations rely on the initial authentication and the CA certificates (that are pushed as a result of the initial authentication during initialization), there are no additional measures to ensure that a worker node is not compromised. This is not just a problem for a new (compromised) worker node joining a cluster but can also be a problem for an existing worker node in the cluster that becomes compromised.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for providing continuous integrity validation-based control plane communication in a container-orchestration system, e.g., the Kubernetes platform. For example, a worker node may locally generate a nonce and forward the nonce to a master node while requesting an attestation token. Using the nonce, the master node generates the attestation token and replies back to the worker node with the attestation token. The worker node may validate the attestation token with a certificate authority (CA) server to ensure that the master node is not compromised. The worker node may then send its authentication credentials to the master node. The master node may then locally generate a nonce and forward the nonce to the worker node while requesting an attestation token. Using the nonce, the worker node generates the attestation token and replies back to the master node with the attestation token. The master node may validate the attestation token with the CA server to ensure that the worker node is not compromised.

In configurations, the worker node may be periodically validated by the master node using locally generated nonces and attestation tokens. Additionally, or alternatively, the master node may validate the worker node using locally generated nonces and attestation tokens in response to an event.

Thus, in configurations, a method in accordance with techniques described herein may include receiving, by a master node from a secondary node, a first randomly generated nonce requesting a first attestation token and based at least in part on the first randomly generated nonce, generating, by the master node, the first attestation token. The method may also include providing, by the master node to the secondary node, the first attestation token. The method may further include receiving, by the master node from the secondary node, authentication credentials based at least in part on the first attestation token being verified by a certificate authority (CA) server.

Additionally, in configurations, the method may also include providing, by the master node to the secondary node, a second randomly generated nonce requesting a second attestation token from the secondary node and receiving, by the master node from the secondary node, the second attestation token, the second attestation token being based at least in part on the second randomly generated nonce. The method may further include providing, by the master node to the CA server, the second attestation token and based at least in part on the second attestation token, receiving, by the master node from the CA server, a second response, the second response indicating validation of the secondary node. The method may also include providing, by the master node to the secondary node, an authorization response.

Additionally, the techniques described herein may be performed by a system and/or device having non-transitory computer-readable media storing computer-executable instructions that, when executed by one or more processors, performs the method described above.

Example Embodiments

In configurations, an attestation token may allow for providing a unidirectional integrity check within a cluster of nodes. Any node may query a second node, e.g., a remote worker node, to validate the integrity (e.g., to ensure the node is not compromised) by sending a query with a locally generated "nonce." The second node may query the trusted platform module (TPM) to generate a new hash based on the received nonce that will be used as part of the attestation token to verify the integrity of the second node. This is included as a part of trusted execution environment (TEE) in security technology. In configurations, the use of such an attestation token is introduced in container-orchestration systems, e.g., Kubernetes, by instructing both the master node and the worker node to challenge the communicating nodes in a bi-directional manner to periodically validate the integrity of the nodes and stop any execution upon detecting any discrepancy based on recorded data.

During the initialization phase, when a worker node looks into the bootstrap-kubeconfig file to fetch the credentials and API-server details, the worker node may be instructed to also perform an integrity check of, e.g., validate, the master node that includes the API-server using an attestation token. Thus, the worker node upon beginning the initial phase of joining a cluster of nodes may send an attestation token request to the master node with a locally generated random nonce. The API-server computes or generates the attestation token based on the received nonce. The API-server replies back to the kubelet of the worker node with the attestation token. The kubelet validates the attestation token with a certificate authority (CA) server to ensure that the integrity of the API-server of the master node is not compromised. As can be seen, the attestation token is different from a traditional CA certificate. Thus, the concept of leveraging such an attestation token (derived based on a locally generated nonce) helps perform an up-to-date integrity check right before sending the authentication credentials of the worker node to the master node. Thus, such an integrity check on the master node ensures that the credentials may be safely shared with the API-server.

In configurations, upon receiving the credentials for authentication from the worker node (e.g., kubelet), the master node (e.g., API-server) may validate the worker node by sending a locally generated nonce and request for an attestation token based on the nonce. The worker node computes or generates the attestation token based on the received nonce. The worker node replies back to the master node with the attestation token. The master node validates the attestation token with the CA server to ensure that the integrity of the worker node is not compromised.

Thus, with such an attestation token/nonce validation (bi-directional approach), if an attacker is attempting a "Privileges and Privilege Escalation" of a worker node type security attack, then during the instantiation of a worker node in a given namespace, a locally generated nonce is computed and then the request is sent to master node for validation. If a high-privileged service account is not available, an attacker may consider obtaining any token with "create pod" privileges in a given namespace. The attacker may then proceed to create pods with any other target service account token from the namespace mounted, thus gaining those privileges. If such an attacker is trying to create pods with other target service accounts, then with the approach of bi-directional validation with the locally computed nonce value, the attack will fail and the security threat attack is prevented.

In configurations, additional attributes may be added in the attestation token request packet from the worker node such as, for example, re-validation interval and wait time in JSON format that can be defined in the worker node service instantiation.yml file. The re-validation interval may define a periodic/continuous re-validation time interval. For example, in configurations, the re-validation time interval may have a periodicity in range of 50 milliseconds (ms) to 200 ms. For example, the master node may re-validate the worker node every 100 ms using the validation process previously described. The wait time may define how long the worker node may have to wait if it fails the re-validation process before trying again, e.g., how long the worker node has to wait before sending a request to the master node for a different nonce value for generating an attestation token. For example, in configurations, wait time may be in a range of 2 to 4 minutes.

In configurations, if there are consecutive failures in consecutive validation intervals, then such a worker node may be classified as a compromised worker node and the worker node may be quarantined, e.g., taken out of service. In configurations, the number of consecutive failures may be in a range of 2 to 5. In configurations, when a worker node fails re-validation a first time, the worker node may be quarantined, e.g., taken out of service. Thus, if a remote code execution (RCE) based attack occurs with an already validated worker node, then "Expiry Timer Logic" from the master node may be triggered and instruct the worker node to re-initiate the local nonce and attestation token generation process followed by validation by the CA server. Since this process happens periodically with a timer-based interval, any userspace based reverse engineered threats by worker pods running in the same worker node may be averted.

In configurations, the worker node may be re-validated in response to an occurrence of an event. Additionally, in configurations, worker nodes may periodically and/or in response to an event re-validate, e.g., challenge, the integrity of the master node. Thus, a re-validation time interval may be defined for the master node where the worker node(s) may periodically re-validate the master node using the process described previously during the initialization phase.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
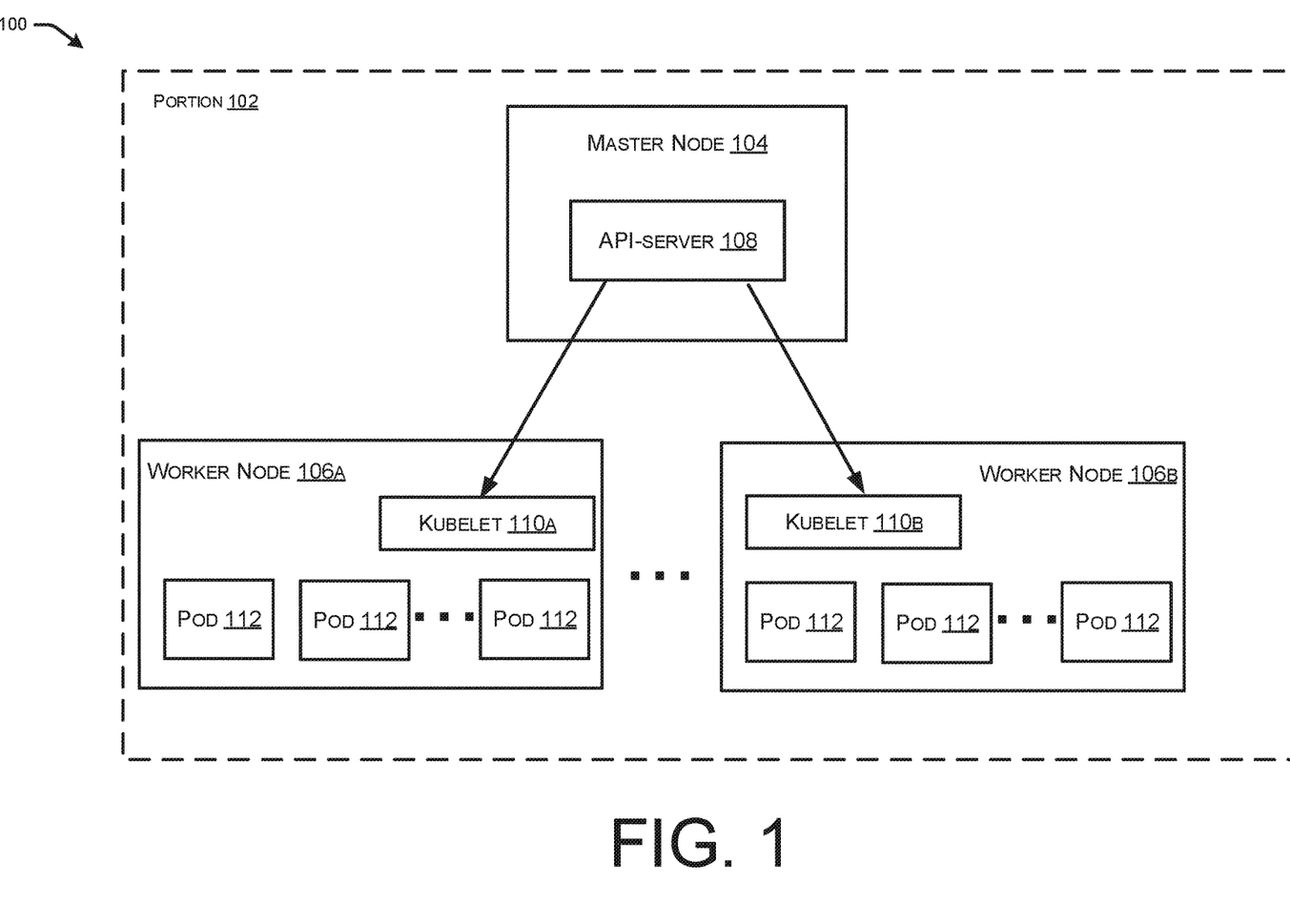
FIG. 1 schematically illustrates example of a portion of a container-orchestration system configured in accordance with the Kubernetes platform.

FIG. 1 schematically illustrates example 100 of a portion 102 of a container-orchestration system configured in accordance with the Kubernetes platform. In configurations, other platforms may be used for configuring the container-orchestration system. The portion 102 includes a master node 104 and two worker nodes 106a, 106b. As is known, the portion 102 may include many more worker nodes 106. The master node 104 includes an API-server 108 and other components not illustrated for clarity. The worker nodes 106a, 106b include kubelets 110a, 110b, respectively, that communicate with the API-server. Each worker nod 106a, 106b includes one or more pods 112, which are groupings of one or more containers (not illustrated).

Figure 2:
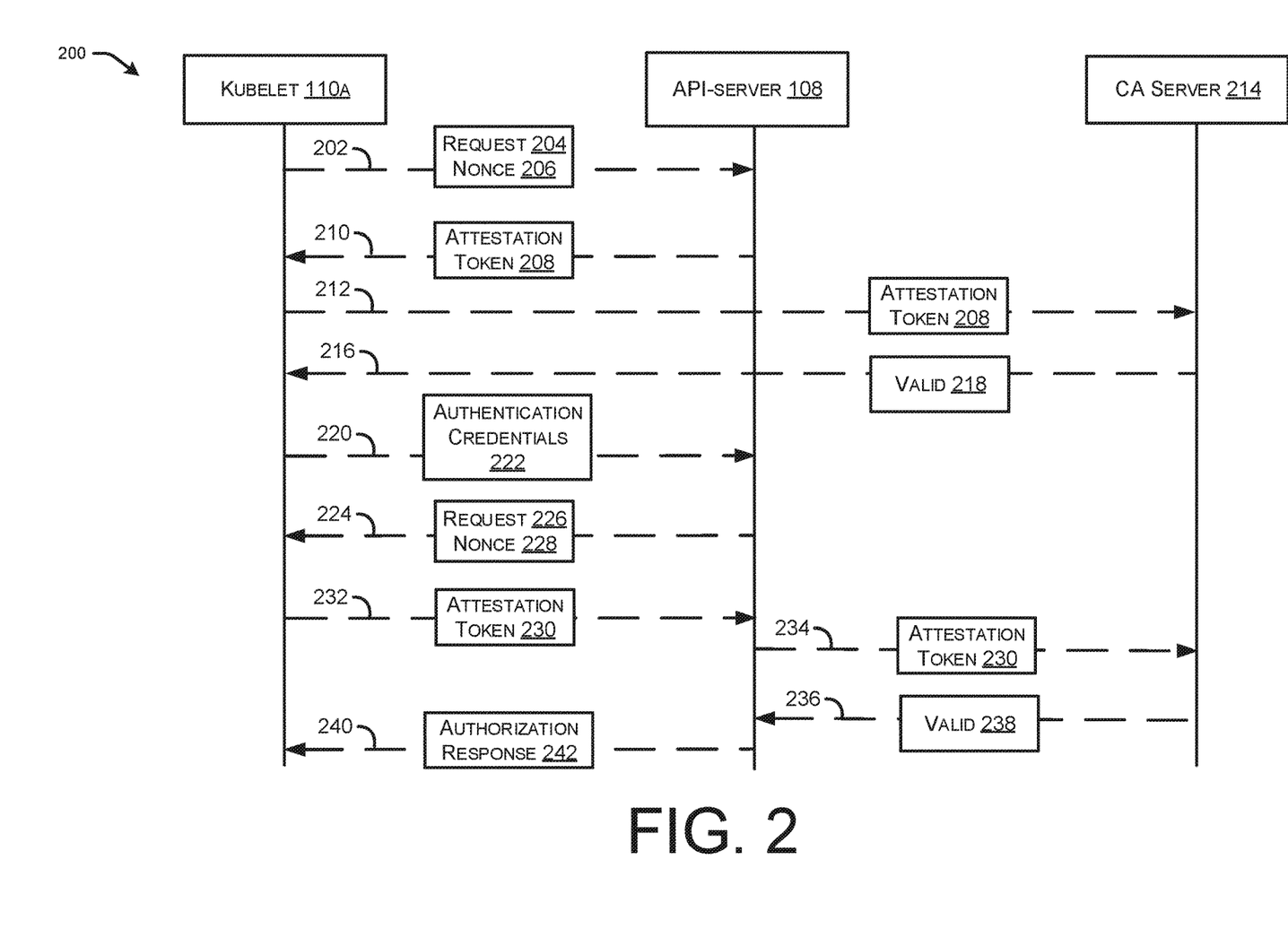
FIG. 2 schematically illustrates an example call flow for validating a master node and a worker node of the container-orchestration system of FIG. 1.

During the initialization phase of, for example, the worker node 106a, the worker node 106a checks a bootstrap-kubeconfig file at the master node 104 to fetch the credentials and API-server details of the master node 104. FIG. 2 schematically illustrates an example call flow 200 for validating a master node and a worker node. During the initialization phase, the worker node 106a may be instructed to also perform an integrity check of, e.g., validate, the master node 104 that includes the API-server 108 using an attestation token. Thus, the kubelet 110a of the worker node 106a, upon beginning the initial phase of joining a cluster of worker nodes of the portion 102, may, at 202, send a request 204 via the kubelet 110a for an attestation token to the master node 104, where the request 114 includes a locally generated random nonce 206. The API-server 108 computes or generates an attestation token 208 based on the received nonce 206. The API-server 108, at 210, replies back to the kubelet 110a of the worker node 106a with the attestation token 208. The kubelet 110a, at 212, sends the attestation token 208 to a certificate authority (CA) server 214 to validate the attestation token 208 to ensure that the integrity of the API-server 108 of the master node 104 is not compromised. If the attestation token 208 is valid, the CA server 214, at 216, replies back with a valid response 218 to the kubelet 110a of the worker node 106a. As can be seen, the attestation token 208 is different from a traditional CA certificate. Thus, the concept of leveraging such an attestation token (derived based on a locally and randomly generated nonce) helps perform an up-to-date integrity check right before the kubelet 110a of the worker node 106a, at 220, sends authentication credentials 222 of the worker node 106a to the API-server 108 of the master node 104. Thus, such an integrity check on the master node 104 ensures that the authentication credentials may be safely shared with the API-server 108.

In configurations, upon receiving the authentication credentials 222 from the kubelet 110a, the API-server 108 may validate the worker node 106a by sending, at 224, a request 226 with a locally generated nonce 228 for an attestation token based on the nonce 228. The kubelet 110a computes or generates an attestation token 230 based on the received nonce 228. The kubelet 110a replies, at 232, to the API-server 108 with the attestation token 230. The API-server 108, at 234, sends the attestation token 230 to the CA server 214 to validate the attestation token 230 to ensure that the integrity of the kubelet 110a of the worker node 106a is not compromised. If the attestation token 230 is valid, the CA server 214, at 236, replies back to the API-server 108 of the master node 104 with a valid response 238 indicating that the integrity of the worker node 106a is not compromised. Upon receiving the valid response 238, the API-server 108, at 240, sends an authorization response 242.

Thus, with such an attestation token/nonce validation (bi-directional approach), if an attacker is trying to do a "Privileges and Privilege Escalation" of a worker node type security attack, then during the instantiation of a worker node, e.g., worker node 106a, in a given namespace, a locally generated nonce, e.g., nonce 206, is computed and then the request is sent to master node, e.g., master node 104, for validation. If a high-privileged service account is not available, an attacker may consider obtaining any token with "create pod" privileges in a given namespace. The attacker may then proceed to create pods with any other target service account token from the namespace mounted, thus gaining those privileges. If such an attacker is trying to create pods with other target service accounts, then with the approach of bi-directional validation with the locally computed nonce value, the attack will fail and the security threat attack is prevented.

In configurations, additional attributes may be added in the attestation token request packet 204 from the worker node, e.g., worker node 106a, such as, for example, a re-validation interval and a wait time, in JSON format that can be defined in the worker node service instantiation.yml file. The re-validation interval may define a periodic/continuous re-validation time interval. For example, in configurations, the re-validation time interval may have a periodicity in range of 50 milliseconds (ms) to 200 ms. For example, the master node 104 may re-validate the worker node 106a (and/or worker node 106b) every 100 ms using the validation process previously described with respect to FIG. 2 using a new nonce. For example, the API-server 108 may validate the worker node 106a by sending the request 226 with a new locally generated nonce 228 for an attestation token based on the nonce 228. The kubelet 110a may compute or generate the attestation token 230 based on the received new nonce 228. The kubelet 110a may reply to the API-server 108 with the attestation token 230. The API-server 108 may send the attestation token 230 to the CA server 214 to validate the attestation token 230 to ensure that the integrity of the kubelet 110a of the worker node 106a is not compromised. If the attestation token 230 is valid, the CA server 214 may reply back to the API-server 108 of the master node 104 with a valid response 238 indicating that the integrity of the worker node 106a is not compromised. Upon receiving the valid response 238, the API-server 108 may send an authorization response 242 to the worker node 106a. In configurations, the worker nodes 106a, 106b may also be (or alternatively) re-validated by the master node 104 in response to an occurrence of an event (e.g., pod creation or pod deletion).

In configurations, the wait time may define how long the worker node 106a may have to wait if it fails the re-validation process before trying again, e.g., how long the worker node 106a has to wait before sending a request to the master node 104 for a different nonce value for generating an attestation token. For example, in configurations, wait time may be in a range of 2 to 4 minutes. An example may include:

Request_Secured_connectivity{
Label: "Label_name"
Service: "Network_Service_Name"
Color: "color"
Request_args:: {
Ip_addr: "NULL"
addr: ":3100",
port: 80,
proto: "tcp"
validation_interval: "100 ms",
wait_time: "3 m",
}

Thus, as can be seen, in this example the revalidation interval is 100 ms and the wait time is 3 minutes. Also, an example kube-apiserver.Yaml file definition may include:
apiVersion: v1
kind: Pod
metadata:
name: kube-apiserver
namespace: kube-system
labels:
tier: control-plane component: kube-apiserver
spec:
hostNetwork: true
containers:
name: kube-apiserver
image: k8s.gcr.io/hyperkube-amd64:v1.16.0-beta.1
imagePullPolicy: IfNotPresent
command: ["/hyperkube", "kube-apiserver"]
args:
"—advertise-address=10.241.255.5"
"—allow-privileged=true"
"—anonymous-auth=false"
"_attestation-token-validation=true"
"_attestation-token-ageout=500 ms"
"—audit-log-maxage=30"
"—audit-log-maxbackup=10"
"—audit-log-maxsize=100"
"—audit-log-path=/var/log/kubeaudit/audit.log"
"—audit-policy-file=/etc/kubernetes/addons/audit-policy.yaml"
"—authorization-mode=Node,RBAC"
"—bind-address=0.0.0.0"
"—client-ca-file=/etc/kubernetes/certs/ca.crt"
"—cloud-config=/etc/kubernetes/azure.json"
"—cloud-provider=azure"

Thus, as can be seen, the file definition indicates that attestation tokens are to be used (attestation-token=true) and that attestation tokens are valid for 500 ms (attestation-token-ageout=500 ms).

In configurations, if there are consecutive failures in consecutive validation intervals, then the worker node 106*a* may be classified as a compromised worker node and the worker node 106*a* may be quarantined, e.g., taken out of service. In configurations, the number of consecutive failures may be in a range of 2 to 5. In configurations, when a worker node fails re-validation a first time, the worker node may be quarantined, e.g., taken out of service. Thus, if a remote code execution (RCE) based attack occurs with an already validated worker node, then "Expiry Timer Logic" from the master node may be triggered and instruct the worker node to re-initiate the local nonce and attestation token generation process followed by validation by the CA server. Since this process happens periodically with a timer-based interval, any userspace based reverse engineered threats by worker pods running in the same worker node may be averted.

In configurations, the worker nodes 106*a*, 106*b* may periodically and/or in response to an event re-validate, e.g., challenge, the integrity of the master node 104. For example, when a worker node, e.g., worker node 106*a*, receives a request for a particular event (e.g., pod creation or pod deletion) from the master node 104, the worker node 106*a* may challenge the master node 104. Additionally, a re-validation time interval may be defined for the master node 104 at the worker nodes, where the worker node(s) may periodically re-validate the master node 104 using the process described previously with respect to FIG. 2 using new nonces. For example, the worker node 106*a* may perform an integrity check of, e.g., re-validate, the master node 104 that includes the API-server 108 using an attestation token. Thus, the kubelet 110*a* of the worker node 106*a* may send a request 204 via the kubelet 110*a* for an attestation token to the master node 104, where the request 114 includes a new locally generated random nonce 206. The API-server 108 may compute or generate an attestation token 208 based on the received new nonce 206. The API-server 108 may reply back to the kubelet 110*a* of the worker node 106*a* with the attestation token 208. The kubelet 110*a* may send the attestation token 208 to a certificate authority (CA) server 214 to validate the attestation token 208 to ensure that the integrity of the API-server 108 of the master node 104 is not compromised. If the attestation token 208 is valid, the CA server 214 may reply back with a valid response 218 to the kubelet 110*a* of the worker node 106*a*.

Figure 3:
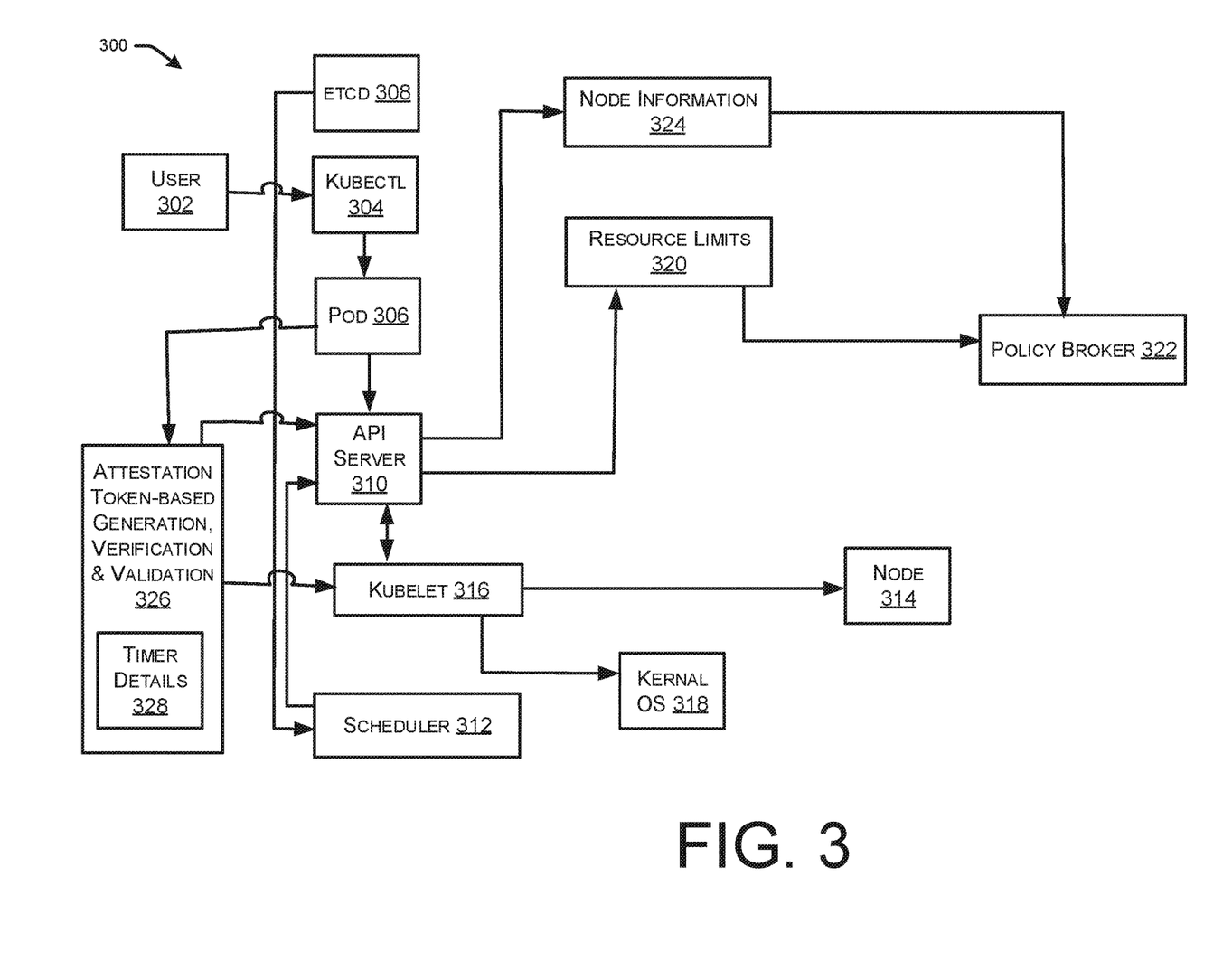
FIG. 3 schematically illustrates an example Kubernetes architecture.

FIG. 3 schematically illustrates an example Kubernetes architecture 300. A user 302 may interact with the kubectl 304. The kubectl 304 is the command line utility that interacts with a Kubernetes API. The kubectl 304 is an interface that is used to communicate and manage pods 306, e.g., pods 112, in a Kubernetes cluster, e.g., worker nodes 106*a*, 106*b*.

An etcd 308 stores the configuration information that can be used by each of the nodes, e.g., the worker nodes 106*a*, 106*b*, in the Kubernetes cluster. The etcd 308 is a high availability key value store that may be distributed among multiple nodes. The etcd 308 is accessible only by a Kubernetes API server 310, e.g., API server 108, as the etcd 308 may include sensitive information. The etcd 308 is a distributed key value store that lets any of the nodes in the Kubernetes cluster read and write data. The API server 310 provides all the operations on the cluster using the Kubernetes API. The Kubernetes API server 310 implements an interface such that different tools and libraries can readily communicate with the API server 310. The kubeconfig is a package along with the server side tools that can be used for communication and exposes the Kubernetes API.

A scheduler 312 is a service in the master node 104 responsible for distributing the workload among a node 314, e.g., one of worker nodes 106*a*, 106*b*. The scheduler 312 is responsible for tracking utilization of working load among the worker nodes 106*a*, 106*b* and then placing the workload on the resources, e.g., the resources (containers) of the worker nodes 106*a*, 106*b*, that are available and accept the workload. In other words, this is the mechanism responsible for allocating pods 306 to available worker nodes. The scheduler 312 is responsible for workload utilization and allocating pods 306 to new worker nodes.

The kubelet 316, e.g., the kubelet 110*a*, is a small service in each node 314, e.g., worker nodes 106*a*, 106*b*, responsible for relaying information to and from control plane service. The kubelet 316 interacts with the etcd store 308 to read configuration details and wright values. The kubelet 316 communicates with the API server 310 to receive commands and work. The kubelet process then assumes responsibility for maintaining the state of work and the node server. It manages network rules, port forwarding, etc. The kubelet 316 also interacts with a kernel operating system (OS) 318 of the corresponding node of the kubelet 316.

The API server 310 also interacts with a resource limits component 320 for controlling limits of resources for the nodes 314. A policy broker component 322 manages policies based on the resource limits 322 and a node information component 324, which is also managed by the API server 310.

When a node 314 desires resources, e.g., creation or deletion of a pod, the request may trigger an attestation token-based generation component 326 to cause the kubelet 316 to validate the integrity of the API server 310, as previously described herein with respect to FIG. 2. Likewise, the API server 310 may validate the node 314 that includes the pod 306 via the kubelet 316, as previously described herein with respect to FIG. 2. The attestation token-based generation component 326 may include timer details 328 to define periodic verification and validation details with respect to API server 310 and node 314. Thus, the attestation token-based generation component 326 may apply the timer details 328 to periodically cause the API server 310 and node 314 (via the kubelet 316) to re-validate, e.g., verify, each other's integrity, as previously described herein with respect to FIG. 2.

For example, the API-server 310 may validate the node 314 by sending a request, e.g., request 226, with a locally generated nonce, e.g., nonce 228. for an attestation token based on the nonce. The kubelet 316 may compute or generate the attestation token, e.g., attestation token 230, based on the received nonce. The kubelet 316 may reply to the API-server 310 with the attestation token. The API-server 310 may send the attestation token to a CA server (not illustrated in FIG. 3) to validate the attestation token to ensure that the integrity of the node 314 is not compromised. If the attestation token is valid, the CA server may reply back to the API-server 310 with a valid response, e.g., valid response 238, indicating that the integrity of the node 314 is not compromised. Upon receiving the valid response, the API-server 310 may send an authorization response, e.g., authorization response 242, to the node 314.

Likewise, for example, the node 314, via the kubelet 316, may perform an integrity check of, e.g., re-validate, the master node that includes the API-server 310 using an attestation token. Thus, the kubelet 314 may send a request, e.g., request 204, for an attestation token to the API-server 310, where the request includes a locally generated random nonce, e.g., nonce 206. The API-server 310 may compute or generate an attestation token, e.g. attestation token 208, based on the received new nonce. The API-server 310 may reply back to the kubelet 316 with the attestation token. The kubelet 316 may send the attestation token to the CA server to validate the attestation token to ensure that the integrity of the API-server 310 is not compromised. If the attestation token is valid, the CA server may reply back with a valid response, e.g., valid response 218, to the kubelet 316.

Figure 4:
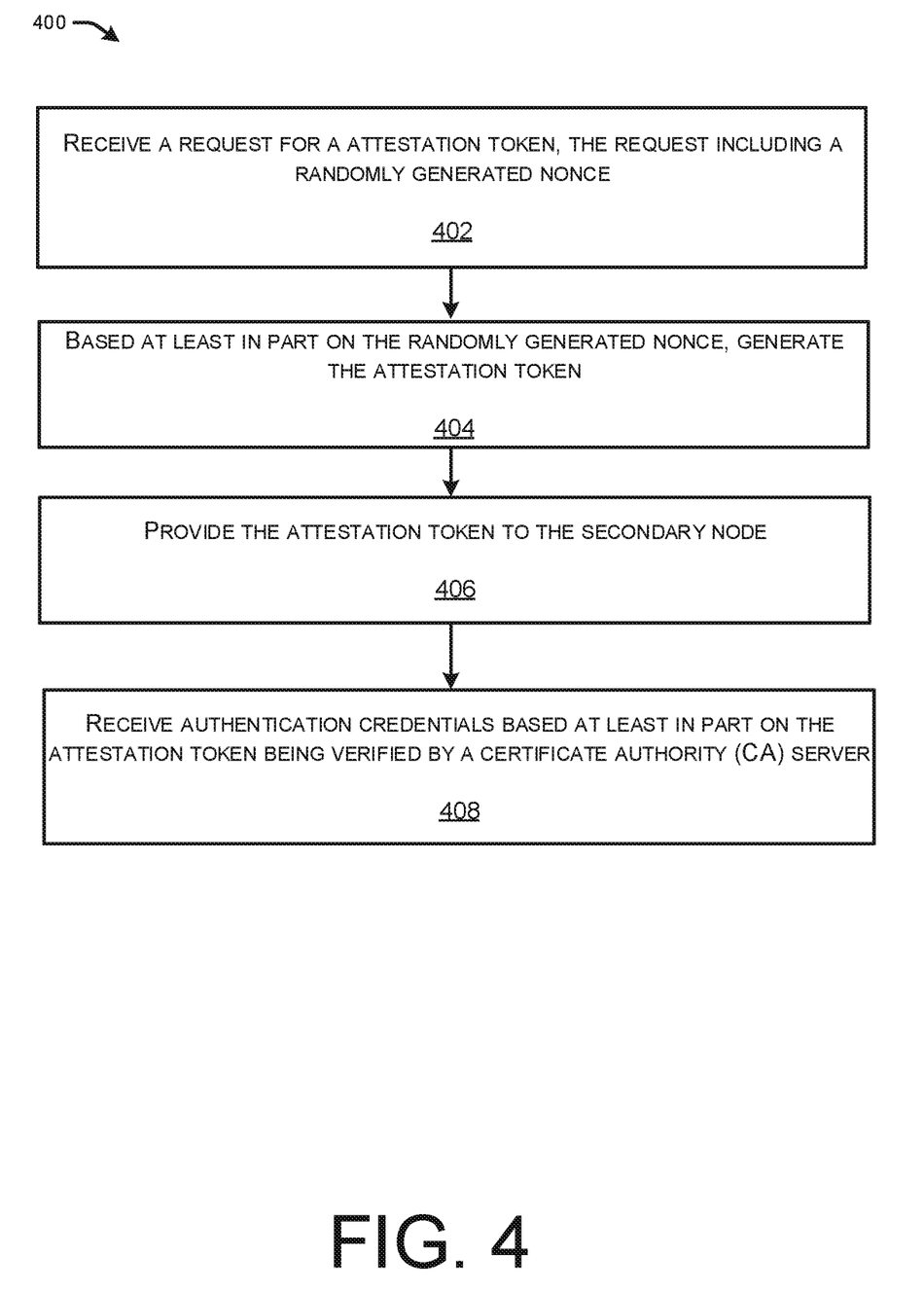
FIG. 4 illustrates a flow diagram of an example method 300 for validating a master node.
Figure 5:
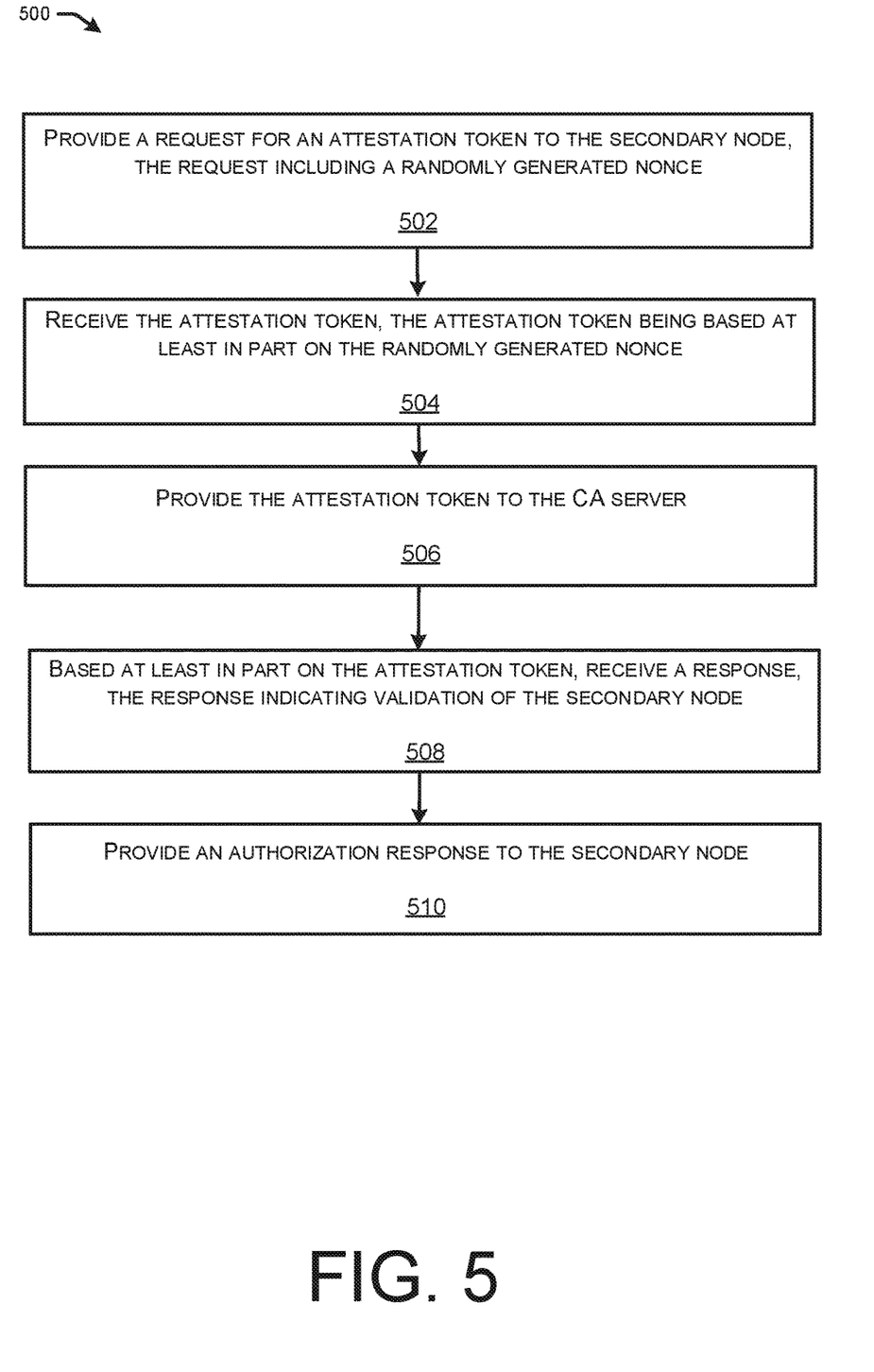
FIG. 5 illustrates a flow diagram of an example method for validating a secondary node.

FIGS. 4 and 5 illustrate flow diagrams of example methods 400 and 500, respectively, that illustrate aspects of the functions performed at least partly by the master node 104 (e.g., API-server 108) and the worker nodes 106a, 106b (e.g., kubelets 110a, 110b) as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for validating a master node, e.g., master node 104. In some examples, the techniques of method 400 may be performed by the master node, e.g., master node 104. In such examples, the master node may comprise one or more hardware interfaces configured to send and receive packets of data in the network, one or more processors, and one or more non-transitory computer-readable media storing computer-executable instructions that, when executed by the one or more processors, cause the one or more processors to perform steps of method 400.

At 402, a request for an attestation token is received by a master node from a secondary node, the request including a randomly generated nonce. For example, the worker node 106a may send a request 204 for an attestation token 208 to the master node 104. The request 204 may include a nonce 206 that has been randomly generated by the worker node 106a.

At 404, based at least in part on the randomly generated nonce, the master node generates the attestation token. For example, the master node 104 may use the randomly generated nonce 206 that it received from the worker node 106a and generate an attestation token 208.

At 406, the master node provides the attestation token to the secondary node. For example, the master node 104 may send the attestation token 208 that it generated using the randomly generated nonce 206 to the worker node 106a.

At 408, the master node receives authentication credentials from the secondary node based at least in part on the attestation token being verified by a certificate authority (CA) server. For example, the worker node 106a may send the attestation token 208 to the CA server 214 for validation. The CA server 214 may validate the attestation token 208 and inform the worker node 106a with a validation response 218 that validates the master node 104. The worker node 106a may then send its authentication credentials 222 to the master node 104.

FIG. 5 illustrates a flow diagram of an example method 500 for validating a secondary node, e.g., worker node 106a. In some examples, the techniques of method 500 may be performed by a master node, e.g., master node 104. In such examples, the master node may comprise one or more hardware interfaces configured to send and receive packets of data in the network, one or more processors, and one or more non-transitory computer-readable media storing computer-executable instructions that, when executed by the one or more processors, cause the one or more processors to perform steps of method 500.

At 502, master node provides a request for an attestation token to the secondary node, the request including a randomly generated nonce. For example, the master node 104 may send a request 226 for an attestation token 230 to the worker node 106a. The request 226 may include a nonce 228 that has been randomly generated by the master node 104.

At 504, the master node receives the attestation token from the secondary node, the attestation token being based at least in part on the randomly generated nonce. For example, the worker node 106a may use the randomly generated nonce 228 that it received from the master node 104 and generate an attestation token 230. The worker node 106a may send the attestation token 230 that it generated using the randomly generated nonce 206 to the master node 104.

At 506, the master node provides the attestation token to a certificate authority (CA) server. For example, the master node 104 may send the attestation token 230 to the CA server 214 for validation.

At 508, based at least in part on the attestation token, the master node receives a response from the CA server, the response indicating validation of the secondary node. For example, the CA server 214 may validate the attestation token 230 and inform the master node 104 with a validation response 238 that validates the worker node 106a.

At 510, the master node provides an authorization response to the secondary node. For example, the master node 104 may send an authorization response 242 to the worker node 106a.

Figure 6:
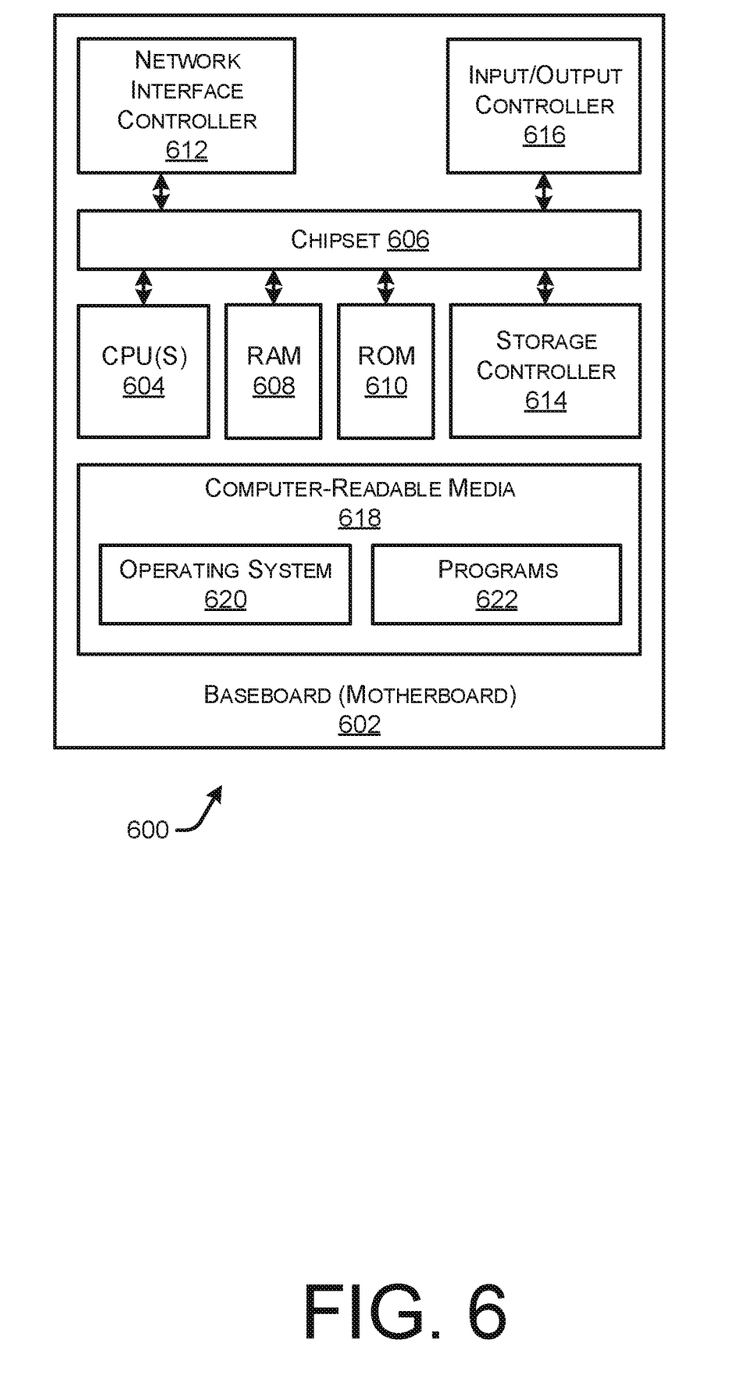
FIG. 6 is a computer architecture diagram showing an illustrative computer hardware architecture for implementing a state change monitoring service and a data gathering and/or analytics service that can be utilized to implement aspects of the various technologies presented herein.

FIG. 6 shows an example computer architecture for a computer 600 capable of executing program components for implementing the functionality described above. One or more computers 600 shown in FIG. 6 may be used to implement one or more elements of the example 100 of the portion 102 of the container-orchestration system described herein, and may comprise a conventional server computer, workstation, desktop computer, laptop, tablet, network appliance, e-reader, smartphone, or other computing device, and can be utilized to execute any of the software components presented herein. In some examples, however, the computer 600 may correspond to networked devices such as servers, switches, routers, hubs, bridges, gateways, modems, repeaters, access points, etc., and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102. The chipset 606 can include functionality for providing network connectivity through a NIC 612, such as a gigabit Ethernet adapter. The NIC 612 is capable of connecting the computer 600 to other computing devices over the portion 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 102, and or any components included therein, may be supported by one or more devices similar to computer 600. Stated otherwise, some or all of the operations performed by the portion 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The programs 622 may comprise any type of programs or processes to perform the techniques described in this disclosure for verifying the integrity of the nodes, e.g., master node 104 and worker nodes 106a, 106b, of the portion of 102 of the container-orchestration system configured in accordance with the Kubernetes platform. Generally, the programs 622 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving, by a master node from a secondary node, a first request for a first attestation token, the first request including a first randomly generated nonce;
based at least in part on the first randomly generated nonce, generating, by the master node, the first attestation token;
providing, by the master node to the secondary node, the first attestation token;
receiving, by the master node from the secondary node, authentication credentials based at least in part on the first attestation token being verified by a certificate authority (CA) server;
providing, by the master node to the secondary node, a second request for a second attestation token, the second request including a second randomly generated nonce;
receiving, by the master node from the secondary node, the second attestation token, the second attestation token being based at least in part on the second randomly generated nonce;
providing, by the master node to the CA server, the second attestation token;
based at least in part on the second attestation token, receiving, by the master node from the CA server, a second response, the second response indicating validation of the secondary node; and
providing, by the master node to the secondary node, an authorization response.

2. The computer-implemented method of claim 1, further comprising:
performing, by the master node, a re-validation process of the secondary node, wherein the re-validation process comprises:
providing, to the secondary node, a third request for a third attestation token, the third request including a third randomly generated nonce;
receiving, from the secondary node, the third attestation token, the third attestation token being based at least in part on the third randomly generated nonce; and
based at least in part on the third attestation token, receiving, from the CA server, a third response, the third response indicating validation of the secondary node based at least in part on the third attestation token being verified by the CA server.

3. The computer-implemented method of claim 2, wherein the re-validation process is performed periodically by the master node.

4. The computer-implemented method of claim 3, wherein a periodicity of the re-validation process is in a range of 50 milliseconds to 200 milliseconds.

5. The computer-implemented method of claim 2, wherein the re-validation process is performed based at least in part in response to an event.

6. The computer-implemented method of claim 2, further comprising:
based at least in part on a failure of the re-validation process by the secondary node, removing the secondary node from service.

7. The computer-implemented method of claim 2, further comprising:
based at least in part on a failure of the re-validation process by the secondary node, re-performing, by the master node, the re-validation process of the secondary node after waiting a predetermined interval of time.

8. The computer-implemented method of claim 7, wherein the predetermined interval of time is in a range of 2 minutes to 4 minutes.

9. The computer-implemented method of claim 7, further comprising:
based at least in part on a failure of the re-performing of the re-validation process by the secondary node, removing the secondary node from service.

10. One or more non-transitory computer-readable media storing computer-executable instructions that, when executed by one or more processors, cause the one or more processors to perform actions comprising:
receiving, from a secondary node, a first request for a first attestation token, the first request including a first randomly generated nonce;
based at least in part on the first randomly generated nonce, generating the first attestation token;
providing, to the secondary node, the first attestation token;
receiving, from the secondary node, authentication credentials based at least in part on the first attestation token being verified by a certificate authority (CA) server;
providing, to the secondary node, a second request for a second attestation token, the second request including a second randomly generated nonce;
receiving, from the secondary node, the second attestation token, the second attestation token being based at least in part on the second randomly generated nonce;
providing, to the CA server, the second attestation token;
based at least in part on the second attestation token, receiving, from the CA server, a first response, the first response indicating validation of the secondary node; and
providing, to the secondary node, an authorization response.

11. The one or more non-transitory computer-readable media of claim 10, wherein the actions further comprise:
performing a re-validation process of the secondary node, wherein the re-validation process comprises:
providing, to the secondary node, a third request for a third attestation token, the third request including a third randomly generated nonce;
receiving, from the secondary node, the third attestation token, the third attestation token being based at least in part on the third randomly generated nonce; and
based at least in part on the third attestation token, receiving, from the CA server, a second response, the second response indicating validation of the secondary node based at least in part on the third attestation token being verified by the CA server.

12. The one or more non-transitory computer-readable media of claim 11, wherein the re-validation process is performed periodically.

13. The one or more non-transitory computer-readable media of claim 11, wherein the re-validation process is performed based at least in part in response to an event.

14. The one or more non-transitory computer-readable media of claim 11, wherein the actions further comprise:
based at least in part on a failure of the re-validation process by the secondary node, removing the secondary node from service.

15. The one or more non-transitory computer-readable media of claim 11, wherein the actions further comprise:
based at least in part on a failure of the re-validation process by the secondary node, re-performing the re-validation process of the secondary node after waiting a predetermined interval of time.

16. The one or more non-transitory computer-readable media of claim 15, wherein the actions further comprise:
based at least in part on a failure of the re-performing of the re-validation process by the secondary node, removing the secondary node from service.

17. A computer-implemented method comprising:
providing, by a master node to a secondary node, a first attestation token, the first attestation token being based at least in part on a first randomly generated nonce;
receiving, by the master node from the secondary node, authentication credentials based at least in part on the first attestation token being verified by a certificate authority (CA) server;
receiving, by the master node from the secondary node, a second attestation token, the second attestation token being based at least in part on a second randomly generated nonce;
receiving, from the CA server, a first response, the first response indicating validation of the secondary node based at least in part on the second attestation token being verified by the CA server;
providing, by the master node to the secondary node, an authorization response; and
performing, by the master node, a re-validation process of the secondary node, wherein the re-validation process comprises:
receiving, from the secondary node, a third attestation token, the third attestation token being based at least in part on a third randomly generated nonce; and
based at least in part on the third attestation token, receiving, from the CA server, a second response, the second response indicating validation of the secondary node based at least in part on the third attestation token being verified by the CA server.

* * * * *